US008908315B2

(12) United States Patent
Ozawa

(10) Patent No.: US 8,908,315 B2
(45) Date of Patent: Dec. 9, 2014

(54) EVALUATION METHOD OF MAGNETIC DISK, MANUFACTURING METHOD OF MAGNETIC DISK, AND MAGNETIC DISK

(75) Inventor: Tsuyoshi Ozawa, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 637 days.

(21) Appl. No.: 13/074,369

(22) Filed: Mar. 29, 2011

(65) Prior Publication Data

US 2012/0077060 A1 Mar. 29, 2012

(30) Foreign Application Priority Data

Mar. 29, 2010 (JP) ................................. 2010-075291

(51) Int. Cl.
G11B 21/02 (2006.01)
G11B 5/31 (2006.01)
G11B 5/84 (2006.01)
G11B 5/455 (2006.01)

(52) U.S. Cl.
CPC .............. *G11B 5/455* (2013.01); *G11B 5/3136* (2013.01); *G11B 5/8408* (2013.01)
USPC ........................................................... 360/75

(58) Field of Classification Search
None
See application file for complete search history.

(56) References Cited

U.S. PATENT DOCUMENTS

| 5,309,301 | A | * | 5/1994 | Gregory et al. ................ 360/137 |
| 5,541,789 | A | * | 7/1996 | Fukuoka et al. ........... 360/234.1 |
| 6,013,161 | A | | 1/2000 | Chen et al. |
| 6,063,248 | A | | 5/2000 | Bourez et al. |
| 6,068,891 | A | | 5/2000 | O'Dell et al. |
| 6,086,730 | A | | 7/2000 | Liu et al. |
| 6,099,981 | A | | 8/2000 | Nishimori |
| 6,103,404 | A | | 8/2000 | Ross et al. |
| 6,117,499 | A | | 9/2000 | Wong et al. |
| 6,136,403 | A | | 10/2000 | Prabhakara et al. |
| 6,143,375 | A | | 11/2000 | Ross et al. |
| 6,145,849 | A | | 11/2000 | Bae et al. |
| 6,146,737 | A | | 11/2000 | Malhotra et al. |
| 6,149,696 | A | | 11/2000 | Jia |

(Continued)

FOREIGN PATENT DOCUMENTS

| JP | 2002-74648 | 3/2002 |
| JP | 2003-067980 | 3/2003 |
| JP | 2004-039049 | 2/2004 |
| JP | 2009-157987 | 7/2009 |

OTHER PUBLICATIONS

Japanese Office Action dated Jan. 23, 2014 from related Japanese Application No. 2010-075291 (M4999JP) 5 pages.

*Primary Examiner* — K. Wong

(57) ABSTRACT

An evaluation method that can easily evaluate properties of a carbon protective film and a lubricant on a magnetic-disk surface or particularly, an evaluation method of a magnetic disk in which the properties of the magnetic-disk surface can be evaluated accurately so that a strict demand for interactions between the magnetic-disk surface and a head can be met is provided. In a state in which an element portion of the magnetic head provided with the head element portion that projects by thermal expansion is projected, after being brought into contact with a predetermined radial position on the surface of the rotating magnetic disk, the head is further made to perform seeking in a state in which the element portion is projected by a specified amount, whereby the properties of the carbon film or the lubricant formed on the magnetic-disk surface is evaluated.

20 Claims, 1 Drawing Sheet

(56) References Cited

U.S. PATENT DOCUMENTS

| | | | |
|---|---|---|---|
| 6,150,015 | A | 11/2000 | Bertero et al. |
| 6,156,404 | A | 12/2000 | Ross et al. |
| 6,159,076 | A | 12/2000 | Sun et al. |
| 6,164,118 | A | 12/2000 | Suzuki et al. |
| 6,200,441 | B1 | 3/2001 | Gornicki et al. |
| 6,204,995 | B1 | 3/2001 | Hokkyo et al. |
| 6,206,765 | B1 | 3/2001 | Sanders et al. |
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,356,405 | B1 * | 3/2002 | Gui et al. ................... 360/70 |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,760,175 | B2 * | 7/2004 | Smith ...................... 360/69 |
| 6,778,353 | B1 | 8/2004 | Harper |
| 6,795,274 | B1 | 9/2004 | Hsieh et al. |
| 6,855,232 | B2 | 2/2005 | Jairson et al. |
| 6,857,937 | B2 | 2/2005 | Bajorek |
| 6,893,748 | B2 | 5/2005 | Bertero et al. |
| 6,899,959 | B2 | 5/2005 | Bertero et al. |
| 6,914,739 | B2 * | 7/2005 | Feliss et al. ................ 360/69 |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,573,682 | B2 * | 8/2009 | Pust et al. .................. 360/294.7 |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |
| 8,101,054 | B2 | 1/2012 | Chen et al. |
| 8,125,723 | B1 | 2/2012 | Nichols et al. |
| 8,125,724 | B1 | 2/2012 | Nichols et al. |
| 8,137,517 | B1 | 3/2012 | Bourez |
| 8,142,916 | B2 | 3/2012 | Umezawa et al. |
| 8,163,093 | B1 | 4/2012 | Chen et al. |
| 8,171,949 | B1 | 5/2012 | Lund et al. |
| 8,173,282 | B1 | 5/2012 | Sun et al. |
| 8,178,480 | B2 | 5/2012 | Hamakubo et al. |

(56) References Cited

U.S. PATENT DOCUMENTS

| | | |
|---|---|---|
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'Im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez; Allen J. |
| 2013/0216865 A1 | 8/2013 | YASUMORI; Junichi; et al. |
| 2013/0230647 A1 | 9/2013 | ONOUE; Takahiro; et al. |
| 2013/0314815 A1 | 11/2013 | YUAN; Hua; et al. |
| 2014/0011054 A1 | 1/2014 | SUZUKI; Kouta |
| 2014/0044992 A1 | 2/2014 | ONOUE; Takahiro |
| 2014/0050843 A1 | 2/2014 | YI; Chang B.; et al. |

* cited by examiner

EVALUATION METHOD OF MAGNETIC DISK, MANUFACTURING METHOD OF MAGNETIC DISK, AND MAGNETIC DISK

TECHNICAL FIELD

The present invention relates to an evaluation method of a magnetic disk to be mounted on a magnetic disk device such as a hard-disk drive (HDD) and more particularly to an evaluation method of an amount of transfer of a carbon film or a lubricant formed on the magnetic disk onto a magnetic head, a manufacturing method of a magnetic disk, and a magnetic disk.

BACKGROUND ART

With the recent trend to higher-capacity information processing, various information recording technologies have been developed. Particularly, a surface recording density of an HDD (Hard Disk Drive) using the magnetic recording technology has continuously increased by a rate of approximately 100% a year. In recent years, an information recording capacity exceeding 250 GB per disk is required for a magnetic disk having a radius of 2.5 inches used in HDD or the like, and in order to meet such demand, realization of an information recording density exceeding 400 Gbits per 1 square inch is in demand. In order to achieve the high recording density in a magnetic disk used in an HDD or the like, magnetic crystal grains constituting a magnetic recording layer handling recording of an information signal need to be refined, and its layer thickness needs to be reduced at the same time. However, in the case of a magnetic disk of an in-plane magnetic recording method (also referred to as longitudinal magnetic recording method or horizontal magnetic recording method) having been merchandized, as the result of development of the refining of the magnetic crystal grains, a thermal fluctuation phenomenon in which thermal stability of the recording signal is damaged by a superparamagnetic phenomenon and the recording signal is lost begins to occur, which makes an obstructive factor to higher recording density of a magnetic disk.

In order to solve this obstructive factor, a magnetic recording medium of a perpendicular magnetic recording method has been proposed recently. In the case of the perpendicular magnetic recording method, different from the in-plane magnetic recording method, a magnetization easy axis of a magnetic recording layer is adjusted to be oriented in the perpendicular direction with respect to a substrate surface. As compared with the in-plane recording method, the perpendicular magnetic recording method can suppress the thermal fluctuation phenomenon, which is suitable for higher recording density. This type of perpendicular magnetic recording mediums include a so-called two-layer type perpendicular magnetic recording disk provided with a soft magnetic underlayer made of a soft magnetic body on a substrate and a perpendicular magnetic recording layer made of a hard magnetic body as described in Japanese Unexamined Patent Application Publication No. 2002-74648 (Patent Document 1).

CITATION LIST

Patent Literature

PTL 1: Japanese Unexamined Patent Application Publication No. 2002-74648

SUMMARY OF INVENTION

Technical Problem

Currently, in order to guarantee reliability of a perpendicular magnetic recording disk suitable for higher density, a load-unload test, a fixed-point floating test and the like are conducted using an actual HDD. In this evaluation, feedback is made usually through a test period of one week to one month on strength of a carbon protective film (resistance) and stains on a magnetic head (particularly on an ABS (Air Bearing Surface)) and particularly on presence of transfer of a lubricant and a result of a transferred amount. However, it takes a long time until the result is fed back in the prior-art load-unload test and fixed-point floating test. Also, the results are fluctuated, and it is likely that characteristics which should have been known were not found.

Recently, in a magnetic head, reduction of spacing has been rapidly promoted through introduction of the Dynamic Flying Height (DFH) technology in which electricity is supplied to a thin-film resistor provided inside an element so as to generate heat and to thermally expand a tip of a magnetic pole, and thus, development of a medium that satisfies a back-off margin of 1 nm of a DFH element is required from now on. In achieving the above, determination is difficult with the present-state evaluation method, and so a new evaluation method is in demand.

The inventor has found that in a state in which an element portion of a magnetic head provided with the head element portion that projects by thermal expansion is projected, after being brought into contact with a predetermined radial position on the surface of a rotating magnetic disk, the magnetic head is further made to perform seeking in a state in which the element portion is projected by a specified amount so that properties of the carbon protective film and a transferred amount of the lubricant to the magnetic head can be detected in a shorter time and more accurately than the prior-art evaluation method.

From the above circumstances, it is obvious that if the properties of the carbon protective film and the lubricant on the manufactured magnetic-disk surface can be evaluated easily and accurately, its utility is extremely high.

The present invention was made in view of the above problems and has an object to provide an evaluation method that can easily evaluate properties of a carbon film and a lubricant on the magnetic-disk surface or particularly to provide an evaluation method of a magnetic disk in which the properties of the carbon film and the lubricant on the magnetic-disk surface can be evaluated accurately so that a strict demand for interactions between the protective film and the lubricant on the magnetic-disk surface and the head can be met, a manufacturing method of a magnetic disk using the evaluation method, and a magnetic disk.

Solution to Problem

The inventor has keenly conducted researches in order to solve the above problems and completed the present invention.

That is, the present invention is an invention having the following configuration.

(Configuration 1)

An evaluation method of a magnetic disk characterized in that in a state in which an element portion of a magnetic head provided with the head element portion that projects by thermal expansion is projected, after being brought into contact with a predetermined radial position on the surface of a rotating magnetic disk, the magnetic head is further made to perform seeking in a state in which the element portion is projected by a specified amount, whereby properties of a carbon film or a lubricant formed on the surface of the magnetic disk is evaluated.

(Configuration 2)

The evaluation method of a magnetic disk described in the configuration 1, in which the projecting amount of the head element portion at measurement is within a range of 0.1 to 10 nm.

(Configuration 3)

The evaluation method of a magnetic disk described in the configuration 1 or 2, in which a contact radius of the head element portion at measurement is a region excluding 1 mm and inside from an inner peripheral edge portion and 0.1 mm and outside from an outer edge portion of the magnetic disk.

(Configuration 4)

The evaluation method of a magnetic disk described in any one of the configurations 1 to 3, in which contact time of the head element portion at measurement is 30 seconds or more.

(Configuration 5)

The evaluation method of a magnetic disk described in any one of the configurations 1 to 4, in which a seek speed at measurement is within a range from 0.1 to 3.0 m/s.

(Configuration 6)

The evaluation method of a magnetic disk described in any one of the configurations 1 to 5, in which a magnetic disk rotation speed at measurement is within a range of 100 to 20000 rpm.

(Configuration 7)

A manufacturing method of a magnetic disk characterized by including a process in which on the basis of an evaluation result by the evaluation method of a magnetic disk described in any one of the configurations 1 to 6, a manufacturing condition of a lubrication layer is determined and the lubrication layer is formed on the surface of the magnetic disk in accordance with the determined manufacturing condition.

(Configuration 8)

The manufacturing method of a magnetic disk characterized by including a process in which on the basis of an evaluation result by the evaluation method of a magnetic disk described in any one of the configurations 1 to 6, a manufacturing condition of a carbon protective layer is determined and the carbon protective layer is formed on the surface of the magnetic disk in accordance with the determined manufacturing condition.

(Configuration 9)

A magnetic disk determined as acceptable by the evaluation method of a magnetic disk described in any one of the configurations 1 to 6.

Advantageous Effects of Invention

According to the present invention, an evaluation method that can easily evaluate properties of a carbon film or a lubricant formed on the surface of a magnetic disk and particularly an evaluation method of a magnetic disk that can accurately evaluate properties of the magnetic-disk surface can be provided, whereby a strict demand for interactions between the magnetic-disk surface and a head can be met.

Also, according to the present invention, a manufacturing method of a magnetic disk including a process in which on the basis of the evaluation method of a magnetic disk of the present invention, a manufacturing condition of a carbon protective layer or a lubrication layer is determined, and the carbon protective layer or the lubrication layer is formed in accordance with the determined manufacturing condition can be provided.

Also, a magnetic disk determined as acceptable by the evaluation method of a magnetic disk of the present invention can pass a drive reliability test, and a magnetic disk provided with high reliability performances can be obtained.

DESCRIPTION OF EMBODIMENTS

Figure 1:
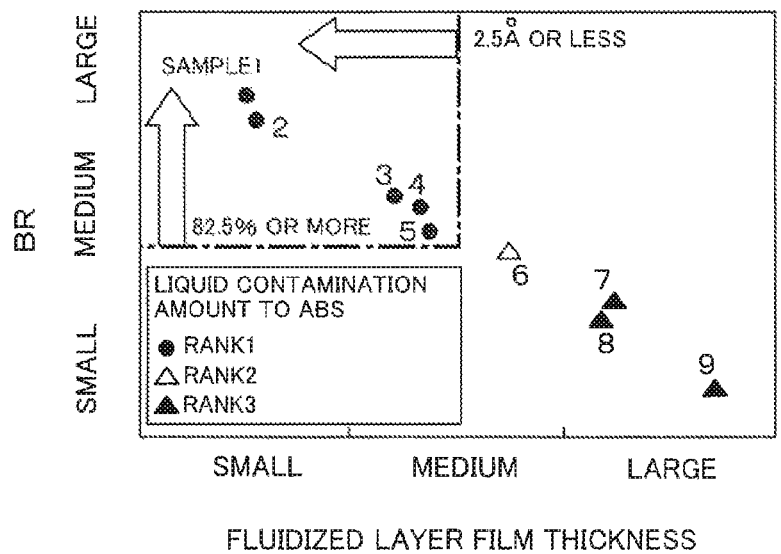
FIG. 1 is a diagram illustrating an evaluation result of liquid contamination in Example 1.

An embodiment of the present invention will be described below in detail.

The present invention is, as described in the configuration 1, an evaluation method of a magnetic disk characterized in that an element portion of a magnetic head provided with the head element portion that projects by thermal expansion is projected, and after being brought into contact with a predetermined radial position on the surface of a rotating magnetic disk, the magnetic head is further made to perform seeking in a state in which the element portion is projected by a specified amount, whereby properties of a carbon film or a lubricant formed on the surface of the magnetic disk is evaluated.

The head element portion (DFH element) thermally expands the magnetic-electrode tip by supplying electricity to a thin-film resistor provided inside the element so as to generate heat. Regarding the DFH technology, description can be found in Japanese Unexamined Patent Application Publication No. 2003-168274, for example. This technology enables reduction in magnetic spacing in a magnetic head while a slider floating amount is maintained. Currently, a distance from the surface of the magnetic disk to an RW element of the DFH element is reduced to as small as several nm.

In the present invention, a projecting amount after the DFH element is brought into contact with the disk surface at measurement is, as in the configuration 2, preferably within a range of 0.1 to 10 nm, for example. In the evaluation method of the present invention, the magnetic disk is rotated and the magnetic head provided with the DFH element which is projected by thermal expansion is floated above the magnetic disk. After that, DFH power is gradually increased so as to make the DFH element portion of the magnetic head projected and brought into contact at a predetermined radial position on the surface of the rotating magnetic disk. Moreover, from the contact point, seeking is made on the magnetic-disk surface in a state in which the DFH element portion is projected by a specified amount.

As a method of detecting a point where the DFH element is in contact with the magnetic-disk surface, detection can be made by mounting an AE sensor that detects an AE output on a head suspension or the vicinity thereof, for example, and by monitoring an output of this sensor.

In the present invention, as in the configuration 3, the contact radius of the head element portion at measurement is preferably a region excluding 1 mm and inside from an inner peripheral edge portion and 0.1 mm and outside from an outer edge portion of the magnetic disk, for example.

Also, in the present invention, as in the configuration 4, contact time of the head element portion at measurement is preferably at least 30 seconds or more and preferably within a range of 5 to 360 minutes, for example.

Also, in the present invention, as in the configuration 5, the seek speed at measurement is preferably within a range of 0.1 to 3.0 m/s.

Also, in the present invention, as in the configuration 6, the rotation speed of the magnetic disk at measurement is preferably within a range of 100 to 20000 rpm, for example.

In the present invention, detection of an amount of transfer of the lubricant formed on the surface of the magnetic disk onto the magnetic head (particularly, onto the ABS surface) can be made by optical microscopic observation of the ABS surface of the magnetic head, for example. Alternatively, the detection can be made by TOF-SIMS (Time Of Flight Secondary Ion Mass Spectrometer) capable of analysis of organic substances at an atomic layer level of a micro region with the size of several nm.

According to the present invention, the properties of the carbon film and the lubricant on the magnetic-disk surface can be easily evaluated, and it is particularly suitable for accurate evaluation of the properties of the carbon film and the lubricant on the magnetic-disk surface that can meet a strict demand for interactions between the magnetic-disk surface and the magnetic head.

Specifically, the evaluation method of a magnetic disk according to the present invention enables determination as to acceptability of the following properties.

That is, regarding the carbon film, the type of the carbon protective film, the carbon-protective-film thickness (if the carbon protective film is thinner than a certain film thickness, pickup becomes easy, for example) and the like, and regarding the lubricant, the type of the lubricant, a refining method of the lubricant, the lubricant film thickness (if the lubricant film thickness is larger than a certain film thickness, pickup can easily occur, for example) and the like can be evaluated.

The evaluation method according to the present invention, that is, in a state in which the element portion of the magnetic head provided with the DFH element portion is projected, the magnetic head is brought into contact with a predetermined radial position on the surface of the rotating magnetic disk and then, the magnetic head is further made to perform seeking in the state in which the element portion is projected by a specific amount. This means to project the DFH element by a certain amount from initial contact and to keep it in contact with the lubricant film or the carbon layer for a certain time rather than to slide the DFH element in point contact only with the major surface of the lubricant layer and usually enables evaluation on the properties of the lubricant and the carbon film in a totally new DFH contact state, whereby more accurate determination as to acceptability is made possible.

A magnetic disk for which evaluation on the properties of the carbon film on the magnetic-disk surface and a transfer amount of the lubricant using the evaluation method according to the present invention is manufactured by forming at least a magnetic layer, a protective layer, a lubrication layer and the like on a substrate for a magnetic disk. The size of a magnetic disk suitable for the present invention is not particularly limited, and the present invention can be applied to any of magnetic disks having the size of 0.85 to 3.5 inches, for example.

As a substrate for a magnetic disk, a glass substrate is preferable. Glass forming the glass substrate is preferably amorphous aluminosilicate glass. This type of glass substrates can be finished to a smooth mirror surface by mirror-polishing the surface. As this type of aluminosilicate glass, aluminosilicate glass containing $SiO_2$ of 58 weight % or more and 75 weight % or less, $Al_2O_3$ of 5 weight % or more and 23 weight % or less, $Li_2O$ of 3 weight % or more and 10 weight % or less, and $Na_2O$ of 4 weight % or more and 13 weight % or less as main component (however, aluminosilicate glass not containing phosphorous oxides) can be used. For example, the glass can be amorphous aluminosilicate glass containing $SiO_2$ of 62 weight % or more and 75 weight % or less, $Al_2O_3$ of 5 weight % or more and 15 weight % or less, $Li_2O$ of 4 weight % or more and 10 weight % or less, $Na_2O$ of 4 weight % or more and 12 weight % or less and $ZrO_2$ of 5.5 weight % or more and 15 weight % or less as main components, having a weight ratio of $Na_2O/ZrO_2$ at 0.5 or more and 2.0 or less and the weight ratio of $Al_2O_3/ZrO_2$ at 0.4 or more and 2.5 or less, and not containing phosphorous oxides.

The glass substrate for a magnetic disk is preferably a mirror surface having maximum roughness Rmax of 6 nm or less on the surface of the glass substrate realized at least by mirror polishing processing and washing processing of the glass substrate. Such a mirror surface state can be realized by performing the mirror polishing processing and the washing processing in this order.

After the washing processing process, chemical reinforcement processing may be applied. As a method of the chemical reinforcement processing, a low-temperature type ion exchange method of performing ion exchange at a temperature of 300° C. or more and 400° C. or less, for example, is preferable.

As a material of the magnetic layer formed on the substrate for a magnetic disk, a CoPt ferromagnetic alloy, which is a hexagonal crystal having a large anisotropy field can be used. As a method of forming the magnetic layer, a sputtering method or a method of forming a film of a magnetic layer on the glass substrate by using a DC magnetron sputtering method, for example, can be used. Also, by interposing an underlayer between the glass substrate and the magnetic layer, an orientation direction of magnetic grains of the magnetic layer or the size of the magnetic grain can be controlled. For example, by using a hexagonal crystal underlayer containing Ru and Ti, the magnetization easy direction of the magnetic layer can be oriented along a normal line of the magnetic-disk surface. In this case, a magnetic disk of the perpendicular magnetic recording type is manufactured. The underlayer can be formed by the sputtering method similarly to the magnetic layer.

Also, on the magnetic layer, the carbon protective layer is formed. As the carbon protective layer, an amorphous hydrogenated carbon protective layer is suitable. The protective layer can be formed by the plasma CVD method, for example. As the film thickness of the protective layer, 10 to 70 angstrom is preferable.

Also, the lubrication layer is further formed on the protective layer. As the lubrication layer, a lubricant having a functional group at the end of a main chain of a perfluoropolyether compound or particularly, a perfluoropolyether compound provided with a hydroxyl group at the end as a polar functional group as a main component is preferable. The film thickness of the lubrication layer is preferably 5 to 15 angstrom. The lubrication layer can be applied and formed by the dip method.

Also, the present invention provides a manufacturing method of a magnetic disk including a process in which on the basis of an evaluation result by the above-described evaluation method of a magnetic disk according to the present invention, manufacturing conditions of the carbon protective layer and the lubrication layer are determined, and the carbon protective layer and the lubrication layer are formed in accordance with the determined manufacturing conditions. For example, samples for which the carbon film thickness or carbon type is known in advance are prepared, and from the evaluation result of these samples according to the present invention, a product provided with a protective layer having desired carbon film thickness and carbon type can be determined. Also, samples for which numeric values of a lubrication-layer bonded rate and a non-fixed lubrication-layer film thickness (the evaluation methods thereof will be described in examples which will be described later) are known in advance are prepared, and from the evaluation results of these samples according to the present invention, a product provided with a lubrication layer having desired lubrication layer bonded rate and non-fixed lubrication-layer film thickness can be determined. Also, samples for which manufacturing conditions (temperature, time, composition and the like) of the carbon protective layer or the lubrication layer are known in advance are prepared, and from the evaluation results of these samples according to the present invention, the desired manufacturing conditions of the carbon protective layer and the lubrication layer can be determined. By forming the carbon protective layer and the lubrication layer on the basis of the desired manufacturing conditions determined as above, a magnetic disk provided with preferable characteristics can be obtained.

EXAMPLE

An embodiment of the present invention will be described below in more detail by referring to examples.

Example

In this example, first, a glass substrate made of disk-shaped aluminosilicate glass having a diameter of 66 mm and a thickness of 1.5 mm was obtained from molten glass by direct press using an upper die, a lower die, and a body mold, which was sequentially subjected to a rough lapping process (rough grinding process), a shape machining process, a fine lapping process (fine grinding process), an end-face mirror machining process, a first polishing process, and a second polishing process and then, subjected to chemical reinforcement so as to manufacture a glass substrate for a magnetic disk. This glass substrate has the main surface and end face mirror-polished.

As the result of visual inspection and detailed inspection of the glass substrate surface having been subjected to the chemical reinforcement and the subsequent washing, no projection caused by adhesion on the glass substrate surface or defect such as a scar was found. Also, surface roughness on the main surface of the glass substrate obtained through the above processes was measured by an atomic force microscope (AFM), and it was found that a glass substrate for a magnetic disk having an extremely smooth surface with Rmax=2.13 nm and Ra=0.20 nm was obtained. The outer diameter of the glass substrate was 65 mm, the inner diameter was 20 mm, and the plate thickness was 0.635 mm.

Subsequently, using a cluster-type sputtering device on the obtained glass substrate for a magnetic disk, an adhesion layer made of a Ti alloy thin film (film thickness: 100 Å), a soft magnetic layer made of a Co alloy thin film (film thickness: 600 Å), a first underlayer made of a Pt alloy thin film (film thickness: 70 Å), a second underlayer made of an Ru alloy thin film (film thickness: 400 Å), and a magnetic layer made of a CoPtCr alloy film (film thickness: 200 Å) were sequentially formed and then, a carbon protective layer was formed by the plasma CVD method. This magnetic disk is a magnetic disk for a perpendicular magnetic recording method.

The above protective layer is a diamond-like carbon protective layer and was formed by the plasma CVD method.

As the lubrication layer to be formed on the above protective layer, a lubricant having a perfluoropolyether compound provided with a hydroxyl group as a polar functional group at the end of the main chain of a perfluoropolyether compound as a main component was used. As for the film thickness of the lubrication layer, 9 types of samples with different film thicknesses from 10 to 16 angstroms were prepared. The lubrication layer can be applied and formed by the dip method.

The samples fabricated as above are referred to as magnetic disks 1 to 9.

As for the above magnetic disks 1 to 9, a transfer amount to the magnetic head ABS surface of the lubricant formed on the magnetic disk in accordance with the method of the present invention was evaluated.

Specifically, a magnetic head provided with a DFH element was made to perform seeking on the surface of the magnetic disks 1 to 9 within a range of the radius of 12.5 to 31.5 mm for 60 minutes, and the lubricant transfer amount onto the head was examined. An additional projecting amount after initial contact of the DFH element at this time was set at 0.5 nm. Also, the disk rotation speed was set at 5400 rpm. Moreover, a seek speed was set at 1.5 m/s.

A relationship between the result of lubricant pickup (transfer) obtained by the test method using DFH element contact according to the present invention and the film thickness of the lubricant, the lubrication-layer bonded rate, the film thickness of the non-fixed lubrication layer (hereinafter referred to as a fluidized layer) was examined. A small value of the fluidized layer film thickness results in less lubricant in a free state, and improvement of the lubricant pickup is assumed. Also, the lubricant pickup amount was evaluated by observation of the ABS surface of the head after test using an optical microscope and rated in five ranks in accordance with the degree of stains as "favorable=rank 1 . . . no stain on the head element portion and the ABS", "slight stains=rank 2 . . . partial adhesion to the head element portion", "medium stains=rank 3 . . . large quantity adhesion to the head element portion", "medium large stains=rank 4 . . . large quantity adhesion to the head element portion and small quantity adhesion to the ABS", "extreme stains=rank 5 . . . large quantity adhesion to the head element portion and large quantity adhesion to the ABS".

Also, bonding of the lubrication layer was evaluated by the following tests.

The film thickness of the lubrication layer of a magnetic disk is measured in advance by using the FTIR (Fourier Transform Infrared Spectrophotometer) method. Subsequently, the magnetic disk is immersed in a solvent (solvent used in the dip method) for 1 minute. By immersing the magnetic disk in the solvent, a portion of the lubrication layer with weak adhesion power is dispersed and dissolved in the solvent, but a portion with strong adhesion power can remain on the protective layer. The magnetic disk is pulled out of the solvent, and the film thickness of the lubrication layer is measured by the FTIR method again. A ratio of the film thickness of the lubrication layer after the immersion in the solvent to the film thickness of the lubrication layer before the immersion in the solvent is referred to as a lubrication layer bonded rate. The higher the bonded rate is, the higher the adhesion performance (close contact) of the lubrication layer can be considered.

FIG. 1 is an evaluation result of liquid contamination of this example. If the liquid contamination adheres to the magnetic head ABS surface, head floating becomes unstable, and non-conformity that data cannot be rewritten during head write in the actual hard disk drive occurs. Also, head-floating for a long time can cause head crush at the worst.

From the result shown in FIG. 1, it was known that on the basis of the evaluation result by the evaluation method of the present invention, pickup of the lubricant on the magnetic disk determined as acceptable was not confirmed (lubricant pickup amount is favorable). On the other hand, lubricant transfer to the magnetic head ABS surface was confirmed on the magnetic disk determined as unacceptable.

Specifically, by forming the lubrication layer under the manufacturing condition in which the lubrication layer bonded rate (bonded rate: BR) is 82.5% or more, for example, and the film thickness of the lubricant fluidized layer is 2.5 Å or less, for example, a magnetic disk that can improve pickup resistance of the lubricant with respect to the magnetic head can be obtained.

It is needless to say that the numeric values of the lubrication layer bonded rate and the film thickness of the lubricant fluidized layer are changed depending on the test head (shape, floating amount and the like) and test conditions (head seek conditions, disk rotation speed, air pressure, temperature and humidity and the like).

As described above, by using the evaluation method (evaluation results) according to the present invention as above, determination as to whether or not the lubricant pickup resistance of the magnetic disk is favorable can be made.

COMPARATIVE EXAMPLE

Figure 2:
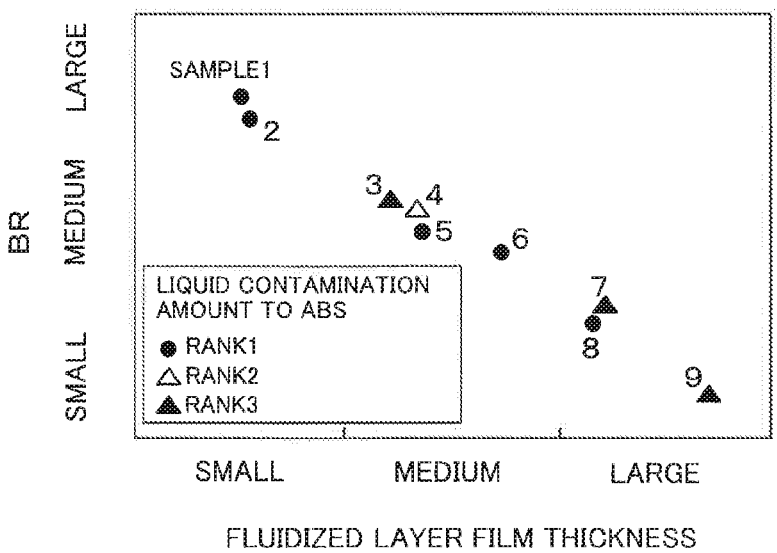
FIG. 2 is a diagram illustrating the evaluation result of the liquid contamination in a comparative example.

As a comparative example of the evaluation method of the present invention, a magnetic disk fabricated in the above example was evaluated in the prior-art load-unload test. The evaluation results of liquid contamination of this comparative example are shown in FIG. 2. As shown in FIG. 2, from the result of examination on the relationship between the lubricant pickup (transfer) result after the load-unload test and the film thickness of the lubricant, the lubrication layer bonded rate, and the film thickness of the fluidized layer, the lubricant pickup onto the head ABS surface was confirmed on a part of the sample magnetic disks but it was found that relationship with the lubrication layer bonded rate and the film thickness of the fluidized layer was not confirmed. Also, the similar evaluation was made by the CFT test using the prior-art fixed-point floating, but a lubricant pickup phenomenon was not found in any of the magnetic disks.

In short, even if a magnetic disk passes an acceptable standard according to the prior-art evaluation method, it might be determined as unacceptable according to the evaluation method of the present invention, and a more accurate evaluation method of a magnetic disk that can be conducted in a shorter time can be provided.

As described above, according to the evaluation method of the present invention, the properties of the carbon protective film and the lubricant on the surface of the magnetic disk can be evaluated easily and accurately, and particularly, an evaluation method of a magnetic disk that can accurately evaluate the properties of the magnetic-disk surface capable of meeting a strict demand for the interaction between the magnetic-disk surface and the magnetic head can be provided. The magnetic disk determined as acceptable by the evaluation method of a magnetic disk according to the present invention can also pass the drive reliability test, and a magnetic disk also provided with high reliability performances can be obtained.

Examples 1 and 2 and Comparative Examples 1 and 2

Subsequently, as the other examples, evaluation was made by changing the film thickness of the lubricant into three sizes, that is, large, medium and small. However, the carbon protective film thickness was set at medium.

The result is as shown in Table 1. In Table 1, the adhesion of the liquid contamination was evaluated in five ranks, that is, 1: small, 3: medium, and 5: large. The term "Push-out" in Table 1 is an additional projection amount after the initial contact of the DFH element, and the numerical values with "+" mean the projection amounts to the inside of the lubrication layer.

TABLE 1

|  |  | Lubricant of sample media | | |
|---|---|---|---|---|
|  | Push-out | Film thickness: small | Film thickness: medium | Film thickness: large |
| Comparative Example 1 | −2 nm | 1 | 1 | 1 |
| Comparative Example 2 | Zero (contact) | 1 | 1 | 2 |
| Example 1 | +1 nm | 2 | 2 | 4 |
| Example 2 | +2 nm | 4 | 5 | 5 |

As for the lubricant, little significant difference was found in Comparative Examples 1 and 2, but it is known that liquid contamination of the sample with the Push-out plus 1 nm and the large lubricant layer film thickness in Example 1 was large. The contamination amount of the Push-out plus 2 nm in Example 2 showed an increasing tendency but a difference by the film thickness was hard to be found.

Examples 3 and 4 and Comparative Examples 3 and 4

Subsequently, as other example, evaluation was made by changing the film thickness of the carbon protective film into three sizes, that is, large, medium and small. However, the lubrication layer film thickness was set at medium.

The result is as shown in Table 2. In Table 2, the adhesion of the granular contamination was evaluated in five ranks, that is, 1: small, 3: medium, and 5: large.

TABLE 2

|  |  | Carbon protective film of sample media | | |
|---|---|---|---|---|
|  | Push-out | Film thickness: small | Film thickness: medium | Film thickness: large |
| Comparative Example 3 | −2 nm | 1 | 1 | 1 |
| Comparative Example 4 | Zero (contact) | 1 | 1 | 1 |
| Example 3 | +1 nm | 3 | 2 | 1 |
| Example 4 | +2 nm | 5 | 3 | 1 |

As for the carbon protective film, little significant difference was found in Comparative Examples 3 and 4, but a significant difference caused by the film thickness was detected in Examples 3 and 4. Particularly, a difference in the granular contamination by the film thickness is marked in Push-out plus 2 nm in Example 4.

From the results of the above Examples 1 to 4 and Comparative Examples 1 to 4, the following findings are obtained.
1. In the case of Push-out plus (pushing-out), the thickness limit of the lubricant can be more clearly detected than the evaluation with the Push-out zero (contact);

2. In the case of Push-out plus (pushing-out), the protective film thickness limit can be more clearly detected than the evaluation with the Push-out zero (contact); and 3. It is effective to select the amount of Push-out in accordance with the purpose of the evaluation. For example, a favorable evaluation can be made for the lubricant pickup by reducing the Push-out amount rather than wear of the protective film.

The evaluation in the above examples was made in the atmospheric environment, but evaluations in combination with a pressure-reduced environment can be also made. Evaluations in combination with temperatures (high temperature and low temperature) or humidity can be also made. Evaluations can be also made by adding a load-unload operation during seeking as an evaluation condition. Evaluation can be also made by fixed-point floating without seeking. Evaluations can be also made in the case of seek-and-stop (after seeking in a specific radius and with a fixed-point floating for a certain time in the specific radius, the specific radius is sought again).

The invention claimed is:

1. An evaluation method of a magnetic disk, the evaluation method comprising:
   thermally expanding a head element portion of a magnetic head;
   bringing the magnetic head into contact with a predetermined radial position on a surface of the magnetic disk that is rotating; and
   evaluating properties of a carbon film or a lubricant formed on the surface of the magnetic disk by performing seeking, using the magnetic head having the head element portion projected by a specified amount, after the magnetic head is brought into contact with the magnetic disk.

2. The evaluation method of a magnetic disk according to claim 1, wherein
   the projecting amount of said head element portion at measurement is within a range of 0.1 to 10 nm.

3. The evaluation method of a magnetic disk according to claim 1, wherein
   a contact radius of said head element portion at measurement is a region excluding 1 mm and inside from an inner peripheral edge portion and 0.1 mm and outside from an outer edge portion of the magnetic disk.

4. The evaluation method of a magnetic disk according to claim 1, wherein
   contact time of said head element portion at measurement is 30 seconds or more.

5. The evaluation method of a magnetic disk according to claim 1, wherein
   a seek speed at measurement is within a range from 0.1 to 3.0 m/s.

6. The evaluation method of a magnetic disk according to claim 1, wherein
   a magnetic disk rotation speed at measurement is within a range of 100 to 20000 rpm.

7. The evaluation method of a magnetic disk according to claim 1, wherein evaluating properties of the carbon film or the lubricant includes evaluating a dimension of the carbon film or the lubricant.

8. The evaluation method of a magnetic disk according to claim 7, the dimension is thickness.

9. The evaluation method of a magnetic disk according to claim 1, evaluating properties of the carbon film or the lubricant includes evaluating a type of the carbon film or the lubricant.

10. The evaluation method of a magnetic disk according to claim 1, wherein the properties of the carbon film are evaluated.

11. The evaluation method of a magnetic disk according to claim 1, wherein the properties of the lubricant are evaluated, and evaluating the properties of the lubricant includes evaluating a refining method of the lubricant.

12. An evaluation method of a magnetic disk, the evaluation method comprising:
    initially contacting a magnetic head with a surface of the magnetic disk;
    projecting a head element of the magnetic disk by a specific amount from the initial contact; and
    evaluating properties of a carbon film or a lubricant formed on the surface of the magnetic disk while keeping the projected head element in contact with the carbon film or the lubricant film.

13. The evaluation method of a magnetic disk according to claim 12, wherein evaluating properties of the carbon film or the lubricant includes evaluating a dimension of the carbon film or the lubricant.

14. The evaluation method of a magnetic disk according to claim 13, the dimension is thickness.

15. The evaluation method of a magnetic disk according to claim 12, evaluating properties of the carbon film or the lubricant includes evaluating a type of the carbon film or the lubricant.

16. The evaluation method of a magnetic disk according to claim 12, wherein the properties of the carbon film are evaluated.

17. The evaluation method of a magnetic disk according to claim 12, wherein the properties of the lubricant are evaluated, and evaluating the properties of the lubricant includes evaluating a refining method of the lubricant.

18. A manufacturing method of a magnetic disk, comprising:
    a process in which on the basis of an evaluation result by the evaluation method of a magnetic disk according to claim 1, a manufacturing condition of a lubrication layer is determined and a lubrication layer is formed on the surface of the magnetic disk in accordance with the determined manufacturing condition.

19. The manufacturing method of a magnetic disk, comprising:
    a process in which on the basis of an evaluation result by the evaluation method of a magnetic disk described in claim 1, a manufacturing condition of a carbon protective layer is determined and the carbon protective layer is formed on the surface of the magnetic disk in accordance with the determined manufacturing condition.

20. A magnetic disk determined as acceptable by the evaluation method of a magnetic disk according to claim 1.

* * * * *